US008581185B2

(12) United States Patent
Makarov et al.

(10) Patent No.: US 8,581,185 B2

(45) Date of Patent: Nov. 12, 2013

(54) ION STORAGE DEVICE WITH DIRECTION-SELECTIVE RADIAL EJECTION

(75) Inventors: Alexander A. Makarov, Bremen (DE); Eduard V. Denisov, Bremen (DE); Alexander Kholomeev, Bremen (DE)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 13/226,390

(22) Filed: Sep. 6, 2011

(65) Prior Publication Data

US 2011/0315873 A1 Dec. 29, 2011

Related U.S. Application Data

(63) Continuation of application No. 12/356,973, filed on Jan. 21, 2009, now Pat. No. 8,030,613, which is a continuation of application No. 11/630,609, filed as application No. PCT/GB2005/002444 on Jun. 21, 2005, now Pat. No. 7,498,571.

(51) Int. Cl.

| | |
|---|---|
| ***H01J 49/42*** | (2006.01) |
| ***H01J 49/26*** | (2006.01) |
| ***B01D 59/44*** | (2006.01) |

(52) U.S. Cl.

USPC ........... 250/292; 250/290; 250/293; 250/281; 250/283; 250/286; 363/171

(58) Field of Classification Search

USPC ................. 250/292, 290, 293, 281, 283, 286; 363/171

See application file for complete search history.

(56) References Cited

U.S. PATENT DOCUMENTS

| | | | | |
|---|---|---|---|---|
| 4,703,190 | A | 10/1987 | Tamura et al. | |
| 6,781,119 | B2 | 8/2004 | Smith et al. | |
| 7,034,293 | B2 * | 4/2006 | Wells | 250/292 |
| 7,034,294 | B2 * | 4/2006 | Schwartz et al. | 250/292 |
| 7,498,571 | B2 * | 3/2009 | Makarov et al. | 250/292 |
| 8,030,613 | B2 * | 10/2011 | Makarov et al. | 250/292 |
| 8,278,619 | B2 * | 10/2012 | Makarov et al. | 250/282 |
| 2002/0162957 | A1 | 11/2002 | Smith et al. | |
| 2005/0023461 | A1 | 2/2005 | Schubert et al. | |
| 2005/0127291 | A1 | 6/2005 | Kawato | |
| 2008/0191129 | A1 | 8/2008 | Makarov et al. | |

FOREIGN PATENT DOCUMENTS

WO WO 03/102545 A2 12/2003

* cited by examiner

*Primary Examiner* — Nikita Wells

(74) *Attorney, Agent, or Firm* — Charles B. Katz

(57) ABSTRACT

The present invention provides a radio frequency (RF) power supply in a mass spectrometer. The power supply provides an RF signal to electrodes of a storage device to create a trapping field. The RF field is usually collapsed prior to ion ejection. In an illustrative embodiment the RF power supply includes a RF signal supply; a coil arranged to receive the signal provided by the RF signal supply and to provide an output RF signal for supply to electrodes of an ion storage device; and a shunt including a switch operative to switch between a first open position and a second closed position in which the shunt shorts the coil output.

12 Claims, 8 Drawing Sheets

ION STORAGE DEVICE WITH DIRECTION-SELECTIVE RADIAL EJECTION

CROSS-REFERENCE TO RELATED APPLICATIONS

This application is a continuation and claims the priority benefit under 35 U.S.C. §120 of U.S. patent application Ser. No. 12/356,973 entitled "RF Power Supply for a Mass Spectrometer" by Makarov et al., filed on Jan. 21, 2009, which is a continuation of U.S. patent application Ser. No. 11/630,609 filed on Dec. 19, 2006, which is a National Stage entry of PCT/GB05/02444, filed on Jun. 21, 2005, which applications are incorporated herein by reference in their entireties.

BACKGROUND OF THE INVENTION

This invention relates to a mass spectrometer radio frequency (RF) power supply for applying a RF field to an ion storage device and to a method of operating an ion storage device using a RF field. In particular, but not exclusively, this invention relates to an ion storage device that contains or traps ions using a RF field prior to ejection to a pulsed mass analyser.

Such traps could be used in order to provide a buffer for the incoming stream of ions and to prepare a packet with spatial, angular and temporal characteristics adequate for the specific mass analyser. Examples of pulsed mass analysers include time-of-flight (TOF), Fourier transform ion cyclotron resonance (FT ICR), Orbitrap types (i.e. those using electrostatic only trapping), or a further ion trap. A block diagram of a typical mass spectrometer with an ion trap is shown in FIG. 1. The mass spectrometer comprises an ion source that generates and supplies ions to be analysed to an ion trap where the ions are collected until a desired quantity are available for subsequent analysis. A first detector may be located adjacent to the ion trap so that mass spectra may be taken, under the direction of the controller. The pulsed mass analyser is also operated under the direction of the controller. The mass spectrometer is generally provided within a vacuum chamber provided with one or more pumps to evacuate its interior.

Ion storage devices that use RF fields for transporting or storing ions have become standard in mass spectrometers, such as the one shown in FIG. 1. Typically, they include a RF signal generator that provides a RF signal to the primary winding of a transformer. A secondary winding of the transformer is connected to the electrodes (typically four) of the storage device. FIG. 2*a* shows a typical arrangement of four electrodes in a linear ion trap device. The elongate electrodes extend along a z axis, the electrodes being paired in the x and y axes. The electrodes are shaped to create a quadrupolar RF field with hyperbolic equi-potentials that contain ions entering or created in the trapping device. Trapping within the storage device is assisted by the use of a DC field. As can be seen from FIG. 2*a*, each of the four elongate electrodes is split into three along the z axis. Elevated DC potentials are applied to the front and back sections of each electrode relative to the larger central section, thereby superimposing a potential well on the trapping field of the ion storage device that results from the superposition of RF and DC field components. AC potentials may also be applied to the electrodes to create an AC field component that assists in ion selection.

FIGS. 2*b* and 2*c* show typical potentials applied to the electrodes. Of most interest is FIG. 2*c* that shows the RF potentials which concern this invention. As can be seen, like potentials are applied to opposed electrodes such that the x-axis electrodes have a potential of opposite polarity to that of the y-axis electrodes.

FIG. 3 shows a power supply capable of providing the desired RF potentials. A RF generator supplies a RF signal to a primary winding of a transformer, as mentioned above. This signal is coupled to the secondary winding of the transformer. One end of the secondary winding is connected to the x-axis pair of opposed electrodes, the other end is connected to the other, y-axis pair of opposed electrodes. A DC offset may be applied using a DC supply connected to a central tap of the secondary winding. AC potentials can also be applied to the electrodes, but this aspect of the storage device need not be considered here.

Further details of this type of ion storage device can be found in U.S. Patent Application Publication No. 2003/0173524.

The inductance in the coils comprising the winding of the transformer and the capacitance between the electrodes forms an LC circuit. The transformer corresponds to high quality resonance coils, with a quality factor reaching many tens or even hundreds. This produces RF amplitudes up to thousands of Volts at working frequencies normally in the range of 0.5-6 MHz.

Such storage devices are often used to store ions prior to ejection to a subsequent mass analyser. Whenever such storage devices are interfaced to other analysers, especially pulsed ones (e.g. to a TOF mass analyser or an electrostatic-only trapping mass analyser such as the Orbitrap mass analyser), a problem of efficient transfer of ions from the storage device to the analyser becomes a stumbling block. When 3D quadrupole RF traps are used as storage devices as the first stage of mass analysis, this problem is traditionally solved by pulsing DC potentials on end-cups of the ion trap in synchronisation with switching off the RF signal generator (S. M. Michael, M. Chien, D. M. Lubman, Rev. Sci. Instrum. 63(10) (1992) 4277-4284). This normally allows extraction of ions from the ion trap, the extraction being facilitated by the typically favourable aspect ratio (i.e. length/width) of the 3D trap. However, the same factor is also responsible for a limited storage volume and hence limited space charge capacity of the 3D trap. Due to the relatively slow and voltage-dependent switching off transition of RF signal generators, resolving power (and, presumably, mass accuracy) of the storage device is severely compromised.

The linear ion trap provides orders of magnitude greater space charge capacity, but its aspect ratio makes direct coupling to pulsed analysers very difficult. Usually, this is caused by the vast incompatability of time scales of ion extraction from the RF storage device (ms) and peak width required for pulsed analysers (ns). This incompatability can be reduced by compressing ions along the axis and then ejecting ions out axially with high-voltage pulses (WO02/078046). However, space charge effects become very important in this case.

The above devices use axial ejection, but an alternative is to eject ions orthogonal to the axis of the storage device (see, for example, U.S. Pat. No. 5,420,425, U.S. Pat. No. 5,763,878, U.S. 2002/0092980 and WO02/078046). For this, DC voltages on opposing rod electrodes are biased in such a way that ions are accelerated through one electrode into the subsequent mass analyser. It is also disclosed that the RF potential on electrodes of the storage device should be switched off in order to limit energy spread and mass-dependence of ion energy. However, these disclosures only state the objective of switching off the RF field at zero phases and do not describe how this could be done. All of the above disclosures (except WO02/078046) relate only to ion storage devices using straight electrodes and only in application to TOFMS.

WO00/38312 and WO00/175935 describe switching off RF potentials on the electrodes of a storage device in a 3D trap/TOFMS hybrid mass spectrometer. These documents disclose switching resonance coils but this has the disadvantage of requiring power supplies with opposite polarities, as well as two high-voltage pulsers for each RF voltage. Large discharge currents impose excessive loads on these power supplies that can be only partly alleviated by adding capacitance in parallel. Also, internal capacitance of pulsers adds to that of the coil thus reducing its resonant frequency. These disclosures do not show how to switch RF off on more than one electrode or on multi-filar coils, or how to combine RF switching with pulsed DC offsets of electrodes of the RF device. The optimum use of this scheme is the rapid start of RF voltage rather than rapid switch-off. Unfortunately, ejection of ions into the subsequent mass analyser requires high speed of switch-off, while switch-on could be considerably slower for typically used quasi-continuous ion sources.

WO00/249067 and U.S. 2002/0162957 disclose switching RF off for a 3D trap mass spectrometer (a leak detector) in order to achieve ion ejection without the use of any DC pulses. However, these documents do not disclose any viable schemes of RF switching except conventional powering down of the primary winding of the coil or use of slow mechanical relays.

Another example of RF switching for a cylindrical trap/TOFMS hybrid has been disclosed by M. Davenport et al, in Proc. ASMS Conf., Portland, 1996, p. 790, and by Q. Ji, M. Davenport, C. Enke, J. Holland, in J. American Soc. Mass Spectrom, 7, 1996, 1009-1017. This scheme utilises two fast break-before-make switches each consisting of two pairs of MOSFETs (per each phase of RF). The circuit's rating is limited by the rating of the MOSFETs (900 V), and the quality of the RF circuit is severely limited by the high capacitance of the MOSFETs (ca. 100 pF each) that is also aggravated by the large number of these elements.

SUMMARY

Against this background, and from a first aspect, the present invention resides in a mass spectrometer RF power supply comprising a RF signal supply; a coil comprising at least one winding, the coil being arranged to receive the signal provided by the RF signal supply and to provide an output RF signal for supply to electrodes of an ion storage device of the mass spectrometer; and a shunt including a switch, operative to switch between a first open position and a second closed position in which the shunt shorts the coil output.

Providing a shunt that short circuits the coil output provides a convenient way of rapidly switching the RF signal supplied to the electrodes of a storage device in a mass spectrometer. The rapid diversion of current through the shunt leads to a rapid collapse of the signal in the secondary winding and, hence, to the RF field generated by the electrodes. With the RF field in the ion storage device switched off, the ions can for example be injected into a mass analyser or the like. Once ions have been ejected, the switch may be operated again to disconnect the shunt, thereby removing the short circuit from the secondary winding. As will be readily understood, this leads to rapid establishment of a signal in the secondary winding and a RF field generated by the electrodes, for example.

The coil may comprise a single winding with split halves. A pump amplifier may be connected between the two halves, this arrangement providing a RF output from the ends of the winding that may be supplied to the electrodes. However, it is currently preferred for the power supply to comprise a transformer, the radio frequency signal supply being connected to a primary winding of the transformer and wherein the secondary winding corresponds to the coil. In this context, the "coil being arranged to receive the signal provided by the radio frequency signal supply" corresponds to coupling of the signal across the windings of the transformer.

Preferably, the power supply further comprises a full-wave rectifier placed across the coil output, and wherein the switch is located on an electrical path linking the coil output to an output point of the full-wave rectifier. Put another way, the electrical path including the switch may be located across a diagonal of the full-wave rectifier. This diagonal may provide the only return current path of the rectifier circuit such that there is no complete current path when the switch is open thereby stopping any current flow through the shunt, but that completes a current path forming the shunt when the switch is closed. Alternatively, the full-wave rectifier may be placed across the coil output where the coil comprises a single winding, as described above.

Use of a full-wave rectifier circuit is particularly beneficial as it is envisaged that the switch will be implemented as a semiconductor switch that is designed to receive unipolar signals: a rectifier circuit, be it full-wave or half-wave, provides such a unipolar signal.

Optionally, the secondary winding comprises a substantially central tap and the switch is located on the electrical path that extends between the centre tap and the output point of the full-wave rectifier. Preferably, the secondary winding comprises two symmetrical coils with the tap being made to the centre portion dividing the two coils, although the exact position of the tap need not be exactly central. Symmetrical coils are beneficial where the electrodes receive two-phase voltages as they help to provide signals of equal magnitude but opposite polarity. In some applications, such as in a 3D ion trap, only a single phase supply may be required. In this case, only a single secondary winding with no central tap may be used.

Preferably, the full-wave rectifier comprises a pair of diodes. One of the diodes may be connected electrically to one end of the secondary winding in a forward configuration thereby conducting current from that end of the secondary winding but not allowing current flow back to that end of the secondary winding. The other diode may be connected to the other end of the secondary winding, also in a forward configuration such that it conducts electricity from the other end of the secondary winding but does not allow current flow back to the other end of the secondary winding. The other sides of the diode are connected along an electrical path that contains an output point to which the electrical path containing the switch is connected. Thus, this latter electrical path provides a return current path for the full-wave rectifier.

Although the above description is of a full-wave rectifier comprising diodes, other components such as transistors or thyristors may be equally employable.

Due to the electrical currents and voltages used with the power supply, the switch is preferably a unipolar high-voltage switch.

Optionally, the power supply further comprises a buffer capacitance connected to the switch, thereby allowing faster recovery of RF signals in the secondary winding upon disconnection of the shunt.

Preferably, the transformer is a radio frequency tuned resonance transformer. Such an arrangement takes advantage of the LC circuit that is formed by virtue of the inductance of the coils and the capacitance within the circuit. For example, the capacitance may be due to the gaps between electrodes within an ion storage device of the mass spectrometer.

Optionally, the power supply may further comprise a DC supply connected to the secondary winding, preferably connected at a central tap of the secondary winding, that may provide a DC offset to the signal generated in the secondary winding. For example, this DC offset could be used to define ion energy during ion entrance into to the trap or exit from it. Furthermore, variable DC offsets may be used.

In some contemplated embodiments of the present invention, the secondary windings comprise multi-filar windings. Such multi-filar windings may comprise two or more separate coils that are preferably located adjacent one another, thereby forming a close coupling such that the signal induced across the transformer is present in all windings of the multi-filar winding. In this configuration, the shunt need not be connected to all of the filar windings and, preferably, is in fact only connected to one of the filar windings. This is because when the shunt is connected across one of the filar windings thereby shorting that filar winding out, the signal collapses in all other coupled filar windings. In order to form the close coupling, the filar windings may be located adjacent one another through juxtaposition (e.g. one beside the other on separate cores) or they may be interposed (e.g. coils could be wound on a common core such that the windings alternate), or in other configurations.

In a further contemplated embodiment of the present invention, a dual RF output may be provided by using a primary winding comprising a pair of coils that are wound in opposite senses.

Furthermore, variable and different DC offsets may be used for different filars, to create a potential well or potential gradient between electrodes. This potential well may be advantageous in trapping ions within a storage device or for their ejection.

From a second aspect, the present invention resides in a mass spectrometer comprising an ion source, an ion storage device, a mass analyser and any of the power supplies described above; wherein the ion storage device is configured to receive ions from the ion source and comprises electrodes operative to store ions therein and to eject ions to the mass analyser; and the mass analyser is operative to collect mass spectra from ions ejected by the ion storage device.

The mass analyser may be of a variety of types, including electrostatic-only types (such as an Orbitrap analyser), time-of-flight, FTICR or a further ion trap. Ions may be ejected from the ion storage device either in the axial direction (i.e. along the longitudinal axis of the storage device) or they may be ejected orthogonal to this axial direction. The ion storage device may be curved so that it has a curved longitudinal axis.

From a third aspect, the present invention resides in a method of operating a mass spectrometer comprising supplying a RF signal to a coil comprising at least one winding connected to electrodes of an ion storage device, thereby creating a RF containing field in the ion storage device to contain ions having a certain mass/charge ratio; and operating a switch thereby to connect a shunt placed across the coil output thereby to short out the secondary winding and to switch off the RF containing field; or operating a switch thereby to disconnect the shunt and to switch on the RF containing field.

Optionally, the coil is a secondary winding of a transformer of the mass spectrometer and passing the radio frequency signal to the coil comprises passing an antecedent radio frequency signal through a primary winding of the transformer, thereby causing the radio frequency signal to appear across the secondary winding.

Preferably, the method further comprises operating a switch such that the shunt is connected or disconnected in synchrony with the phase of the RF signal. This may be preferable in that the switch is connected and disconnected controllably at the same time within the phase of the RF signal. At present, it is preferred to switch the shunt when the RF signal substantially passes through its average value. This average value may correspond to zero, although this need not necessarily be so. For example, a DC bias may be applied to the RF signal directly.

Optionally, the method further comprises stopping the RF signal passing through the primary winding when the shunt is connected across the secondary winding. This connection and disconnection may be performed as soon as possible after connection and as soon as possible before disconnection. Stopping the RF signal may optionally comprise switching a RF signal generator off, although other options such as throwing a switch or even providing a further shunt may be employed.

Optionally, the method may further comprise applying a constant or variable DC offset to the electrodes. Optionally, the DC offset applied has a fast rise time, i.e. such that the rise time is far shorter than the time for all ions to be ejected from the ion storage device. Advantageously, this causes the ejected ions to have energies that are independent of their masses. Alternatively, the DC offset may be time dependent such that its magnitude varies to provide ejected ions with energies related to their mass. For example, continuously ramping or stepping the DC offset will result in light ions being ejected with less energy than heavier ions.

The method may optionally comprise switching off the radio frequency field and then applying the DC offset only after a delay. Such a method provides beneficial focussing when ejecting ions to a TOF mass spectrometer. The length of the delay may be varied to find a value that achieves optimal focussing.

The DC offset may preferably be applied to the secondary windings, optionally to a central tap of the secondary winding. Applying the DC offset may optionally be performed to trap ions in the ion storage device or, alternatively, the DC offset may optionally be used to eject ions from the storage device. Ejection may be performed either axially or orthogonally.

Optionally, the method may comprise operating the switch to switch off the radio frequency containing field; introducing ions into the ion storage device; and operating the switch to switch on the radio frequency containing field thereby to trap ions in the ion storage device. The switch may be operated to turn on the radio frequency containing field when the ions approach or arrive at the central axis of the ion storage device. The ions may be injected radially into the ion storage device.

In a currently contemplated application of the present invention, the radio frequency containing field is switched on to trap ions in the ion storage device, the method comprising operating the switch to switch off the radio frequency containing field and, after a short delay, operating the switch to switch on the radio frequency containing field; and, during the short delay, introducing electrons into the ion storage device. The short delay is chosen such that only minimal, if any, ion loss from the ion storage device results. For example, the short delay be chosen to be less than the time taken for ions to drift from the ion storage device. The method may comprise injecting low energy electrons into the ion storage device, in which case the absence of an RF field is beneficial because it would otherwise excite the electrons to high energy. The low-energy electrons may be provided for electron-capture dissociation (ECD).

Where the ion storage device contains ions trapped by the radio frequency containing field, the method may optionally comprise operating the switch to switch off the radio frequency containing field; and applying DC offsets selectively to the electrodes thereby to cause ejection of ions trapped in the ion storage device in a desired direction. The desired direction may be so as to eject ions through gaps provided between the electrodes or through apertures provided in the electrodes.

From a fourth aspect, the present invention resides in a method of collecting a mass spectrum comprising operating an ion source to generate ions; introducing ions generated by the ion source to an ion storage device; operating the ion storage device according to any of the methods described above thereby to contain ions in the storage device and to eject ions to a mass analyser; and operating the mass analyser to collect a mass spectrum from ions ejected by the ion storage device.

From a fifth aspect, the present invention resides in a method of collecting a mass spectrum from a mass spectrometer comprising operating an ion source to generate ions; introducing ions generated by the ion source to an ion trap having elongate electrodes shaped to form a central, curved longitudinal axis; operating the ion trap according to the method as described above thereby to trap ions and to eject ions on paths substantially orthogonal to the longitudinal axis such that the ion paths converge at the entrance of an electrostatic-only type mass analyser; and operating the mass analyser to collect a mass spectrum from ions ejected from the ion trap.

Generally, ions will orbit around the longitudinal axis following complex paths. These ions are thus ejected in a direction substantially orthogonal to the longitudinal axis, i.e. in a direction more or less at right angles to the points on the longitudinal axis the ion is currently passing. This direction is towards the concave side of the ion trap to ensure the many possible ion paths converge. The curvature of the ion trap and the position of the mass analyser are such that the ion paths converge at the entrance to the mass analyser, thereby focussing the ions.

From a sixth aspect, the present invention resides in a computer program comprising program instructions that, when loaded into a computer, cause the computer to control an ion storage device in accordance with any of the methods described above. Furthermore, from a seventh aspect, the invention resides in a controller programmed to control an ion storage device in accordance with any of the methods described above.

BRIEF DESCRIPTION OF THE DRAWINGS

Examples of the present invention will now be described with reference to the accompanying drawings, in which.

DETAILED DESCRIPTION OF EMBODIMENTS

Figure 4:
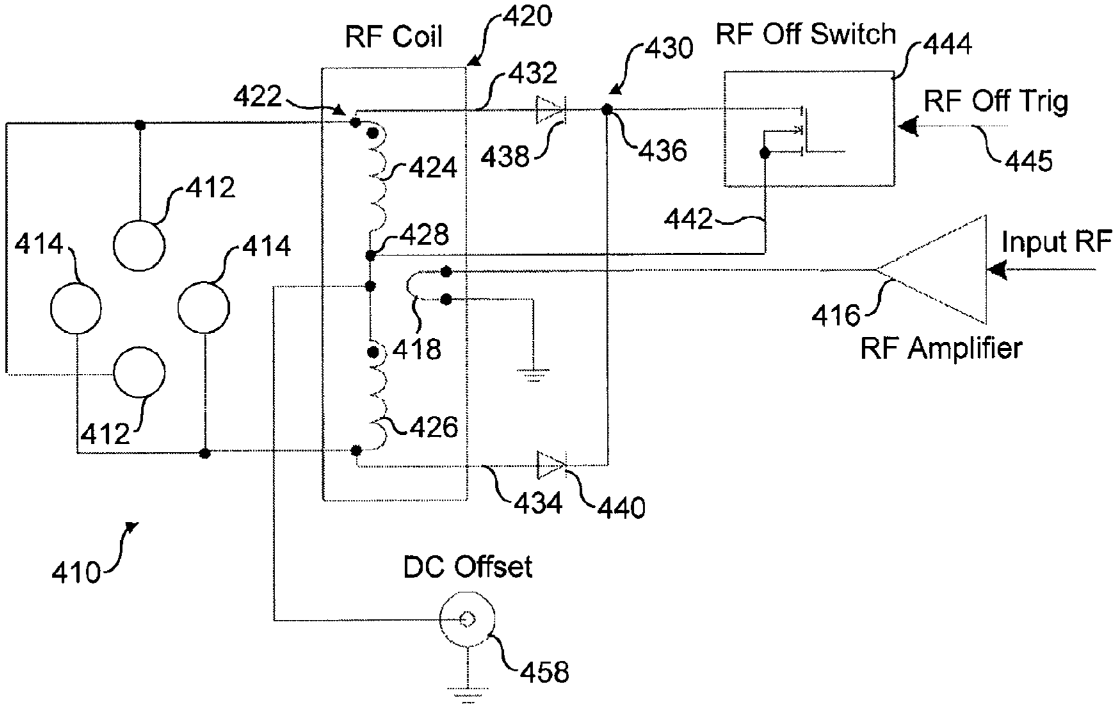
FIG. 4 shows a power supply according to a first embodiment of the present invention for supplying RF and DC potentials to electrodes of an ion trap.

A power supply 410 for providing RF and DC potentials to four electrodes 412, 414 of a linear ion trap is shown in FIG. 4. A RF amplifier 416 provides a RF signal to the primary winding 418 of a RF-tuned resonance transformer 420. The transformer 420 comprises a secondary 422 comprised of two symmetrical windings 424, 426 provided with a central tap 428 therebetween. The end of the secondary winding 424 remote from the central tap 428 is connected to opposed electrodes 412 that comprise the upper and lower electrodes of the ion trap. The end of secondary winding 426 remote from the central tap 428 is connected to opposed electrodes 414 that form the left and right electrodes of the ion trap.

In addition, a full-wave rectifier circuit 430 is also connected to the remote ends of secondary windings 424 and 426. The full-wave rectifier 430 comprises two electrical paths 432 and 434 extending from the remote ends of the secondary windings 424, 426 that meet at a junction 436. Each of the paths 432 and 434 are provided with a diode 438 and 440 respectively so as to allow current flow from the remote ends of the secondary windings 424, 426 but not to allow current flow back to those remote ends. The junction 436 is connected by a further electrical path 442 to the central tap 428 of the secondary 422 to form a shunt 442. This electrical path 442 is provided with a RF-off switch 444 that operates in response to a trigger signal 445. The switch itself is made using a transistor.

Figure 5A:
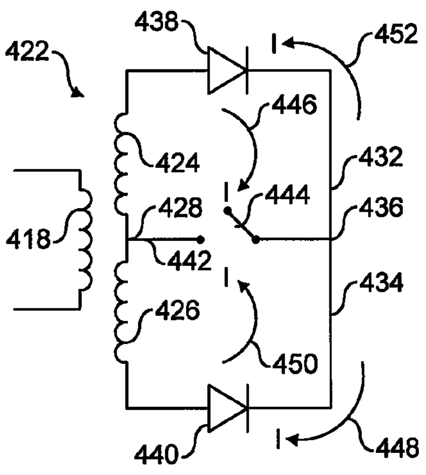
FIGS. 5*a* and 5*b* show current flow around the full-wave rectifier of the power supply of FIG. 4.

FIG. 5*a* shows the full-wave rectifier 430 with the switch 444 in an open position. With the switch 444 open, there is no continuous current loop around the full-wave rectifier 430 so that there is no current flow. This is because any current flowing through diode 438 along electrical path 432 cannot flow through switch 444 as indicated by arrow 446, nor can it flow through the other reverse-biased diode 440 as indicated by arrow 448. Similarly any current flowing through diode 440 along current path 434 cannot flow through switch 444 as indicated by arrow 450, nor can it flow through the other diode 438 as indicated by arrow 452. Accordingly, when current flows through the primary 418, the induced current in the secondary 422 can only flow to the electrodes 412, 414. Hence, the RF signal supplied to primary 418 results in a RF potential on the electrodes 412, 414 thereby creating a RF field within the ion trap.

Figure 5B:
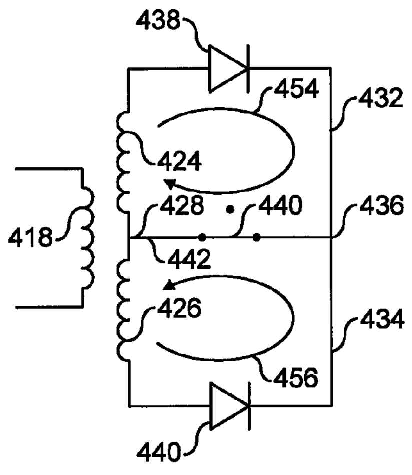

FIG. 5*b* shows the full-wave rectifier 430 when switch 444 is closed. In this instance, there is a complete current path through the rectifier 430. In one phase of the RF signal supplied to the primary 418, current will flow through secondary winding 424 to diode 438 along current path 432. Although this current cannot pass through diode 440, it can return along shunt 442 via switch 444 as indicated by the arrow 454. For the other phase of the RF signal applied to primary 418, current will flow through secondary winding 426 to diode 440 along electrical path 434. Although the current cannot flow through diode 438, it returns via shunt 442 and switch 444 as indicated by arrow 456. Accordingly, whatever the phase of the RF signal supplied to primary 418, a low resistance current path is formed by the full-wave rectifier 430 that shorts out current flow through either secondary winding 424 and electrodes 412 or secondary winding 426 and electrodes 414. Thus, no RF potential is seen by the electrodes 412, 414 and the RF field within the ion trap collapses.

Clearly, the switch 444 can be operated once more to return the full-wave rectifier 430 to the configuration shown in FIG. 5*a*. When this is done, current can now only flow through secondary windings 424, 426 via the electrodes 412, 414. Of course, this re-establishes the RF field within the ion trap.

Figure 6:
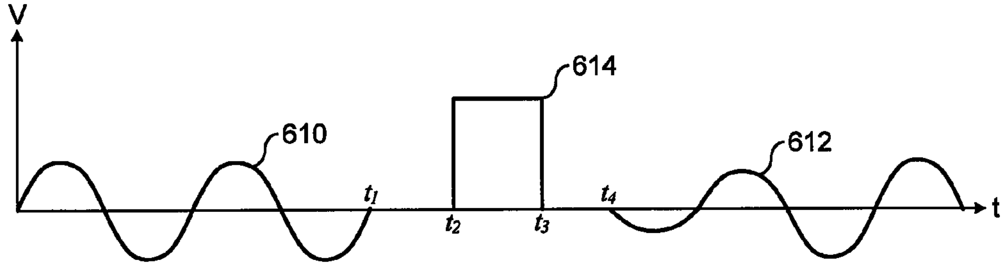
FIG. 6 shows voltage waveforms at present in the secondary windings of a transformer of the power supply of FIG. 4.

This operation is reflected in FIG. 6 where the voltage waveform seen by the electrodes 412, 414 is shown. Initially, the voltage waveform is shown at 610 and terminates at $t_1$ where switch 444 is closed, thereby shorting out the secondary windings 412, 414. Switch 444 is closed as the voltage waveform passes through the zero value. After a delay, switch 444 is opened at $t_4$ thereby establishing once more the voltage waveform 612 seen by the electrodes 412, 414. As will be readily appreciated, the voltage waveforms 610, 612 may correspond to that seen by either pair of electrodes 412 or 414. The other pair of electrodes 412, 414 will see a corresponding but inverted voltage waveform. As can be seen from FIG. 6, switch 444 is opened relative to the phase of the signal being supplied to the primary 418 such that voltage waveform 612 begins at the zero crossing.

In addition to the RF potential applied to the electrodes 412, 414 described above, a DC potential may also be supplied to the electrodes 412, 414. The DC signal is supplied by a DC offset supply 458 that is connected to the central tap 428 of the secondary 422 such that this DC offset is seen by all electrodes 412, 414. Accordingly, a DC offset may be added to the RF potential applied to the electrodes 412, 414 or may alternatively be supplied to the electrodes 412, 414 when they are not receiving the RF potential. For example, FIG. 6 shows a situation where RF only is supplied to the electrodes 412, 414 such that they see the voltage signal 610. This creates a RF field within the ion trap that traps ions for subsequent analysis in a mass analyser. When ejection of the ions from the ion trap is desired, the switch 444 is closed at $t_1$ thereby shorting out the secondary 422 and collapsing the RF field in the ion trap. A short time later at $t_2$, a DC pulse 614 is applied to the electrodes 412, 414 to create a DC field that ejects the ions from the ion trap. After sufficient time for all ions to be ejected, at $t_3$ the DC offset is switched off and then a short time later at $t_4$, the switch 444 is opened such that a new RF field is established in the ion trap ready for trapping further ions. Pulsing the DC waveform 614 will not cause parasitic oscillations of radio frequency at the resonant frequency as the secondary 422 is shorted via the shunt operated by switch 444.

Figure 7A:
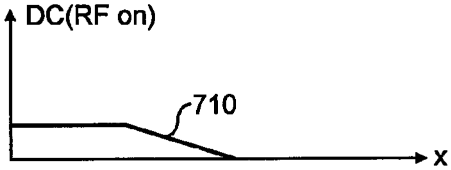
FIGS. 7*a* and 7*b* show DC potentials applied to the electrodes of FIG. 4.
Figure 7B:
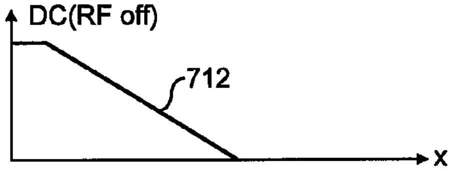

The DC pulse 614 may be used to extract ions orthogonally from the ion trap. Conventionally, the ions are extracted through one of the electrodes 412, 414 that are used to define x and y axes within the ion trap. For example, the ions may be ejected through one of the electrodes 414 in the x-direction. FIG. 7*b* shows a linear DC field that may be created for this extraction, such that its gradient follows the x-direction. Whilst the RF is being applied to the electrodes 412, 414, no DC field is present across electrodes of the ion trap such as that shown in FIG. 7*a*.

In view of the voltages and currents seen in operation in the transformer 420, switch 444 corresponds to a unipolar high voltage switch. The diodes 438 and 440 are selected to have a low capacitance (typically, a few pF). Accordingly, this has only minimal effect on the overall capacitance seen by the resonant circuit which is dominated by the capacitance between electrodes 412, 414. The diodes 438 and 440 may either be individual diodes or a series of diodes with appropriate current and voltage ratings could be used instead as conditions dictate. Moreover, switch 444 may be a single switching device but also could be formed by a series of semiconductor devices such as MOSFET or bipolar transistors or thyristors, etc. Examples of multi-transistor switches are illustrated in the following embodiments.

Figure 8A:
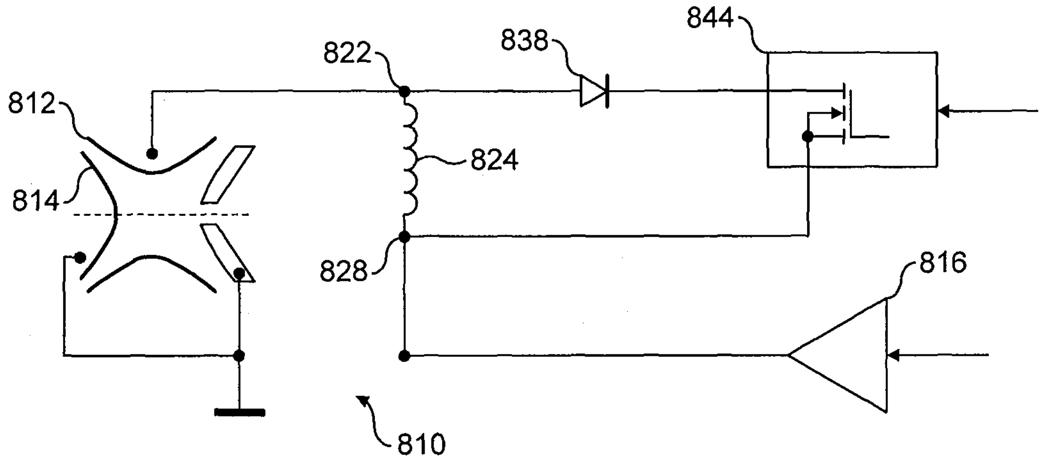
FIGS. 8*a* and 8*b* correspond to FIG. 4 but show second and third embodiments of the present invention.
Figure 8B:
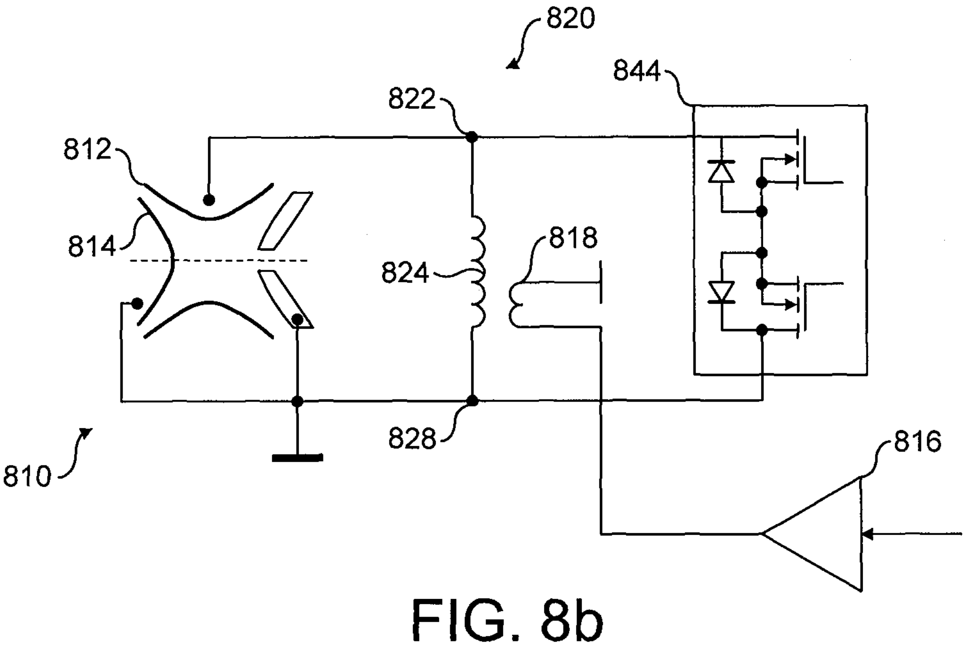

The power supply 410 of FIG. 4 may be simplified without departing from the scope of the present invention. Two such examples are shown in FIGS. 8*a* and 8*b*. As the embodiments presented in this description contain many common elements, a numbering convention will be followed where a number is assigned to a particular feature that is prefixed by a leading digit that reflects the Figure number. Hence, the power supply 410 of FIG. 4 becomes power supply 810 of FIG. 8.

FIG. 8*a* shows a simple embodiment of the invention that uses a rectifier 838. A power supply 810 for providing RF potentials to electrode 812 of a quadrupole ion trap is shown. A RF amplifier 816 provides a RF signal to the winding of a RF-tuned resonance transformer 810. The end 822 of the transformer 820 remote from a central tap 828 is connected to electrode 812 of the quadrupole ion trap. A transistor-based RF-off switch 844 is connected to junction 822 via a diode 838. Though this circuit shorts the coil only for half-wave, power dissipation could be high enough to reduce RF amplitude sharply, especially if it is accompanied with powering down of the RF amplifier 816.

FIG. 8*b* shows a simple embodiment of the invention using a pair of switches 844. A power supply 810 for providing RF potentials to ring electrode 812 of a quadrupole ion trap is shown. A RF amplifier 816 provides a RF signal to the winding of a RF-tuned resonance transformer 820. The end 822 of the transformer 820 remote from the tap 828 is connected to electrode 812 of the quadrupole ion trap. A pair of transistor-based RF-off switches 844 in reverse connection bridge across the RF coil 824. This circuit shunts the coil without the need for any additional diodes (because the diodes shown in switch 844 are parasitic ones, being intrinsic to semiconductor switches of the commonly-used type).

Figure 9:
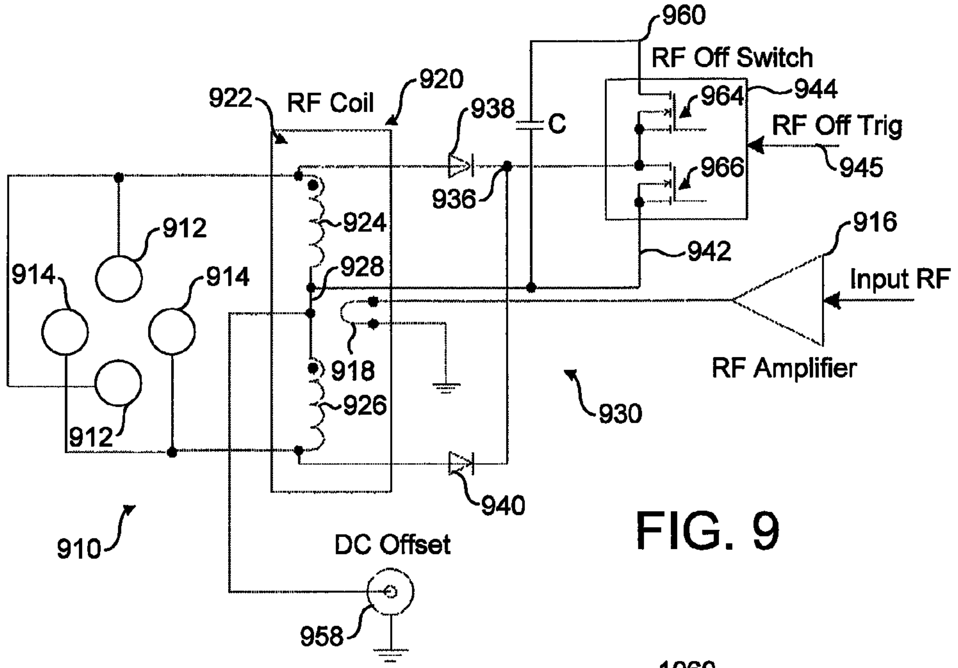
FIG. 9 corresponds to FIG. 4 but shows a fourth embodiment of the present invention.

FIG. 9 shows a power supply 910 according to a fourth embodiment of the present invention that ensures more rapid re-establishment of the RF field in the ion trap when switch 944 is opened to remove the shunt. FIG. 9 shares many of the features of FIG. 4. Thus, as mentioned above, like reference numerals are used, merely replacing the leading "4" by a leading "9" so that, for example, switch 444 becomes switch 944.

As can be seen from FIG. 6, the voltage waveform 612 that arises on opening the switch 944 has an attenuated amplitude that increases to reach the amplitude of the previous voltage waveform 610. This recovery time does in fact depend upon several parameters, for example the power of the RF amplifier 916 and the internal capacitance of the switch 944, among other things. This problem can be addressed by the inclusion of a further electrical path 960 that runs from the shunt 942 that connects switch 944 to central tap 928, the electrical path 960 also extending to the switch 944 that now comprises a pair of semiconductor switches 964 and 966. Shunt 942 extends to semiconductor switch 966 and electrical path 960 extends to semiconductor switch 964. The junction 936 on the output side of the diodes 938 and 940 is connected to both semiconductor switches 964 and 966, such that switches 964 and 966 control two return paths. The electrical path 960 is provided with a buffer capacitance 962 which ensures more rapid recovery of the RF field in the ion trap on opening the switch 944.

Figure 10:
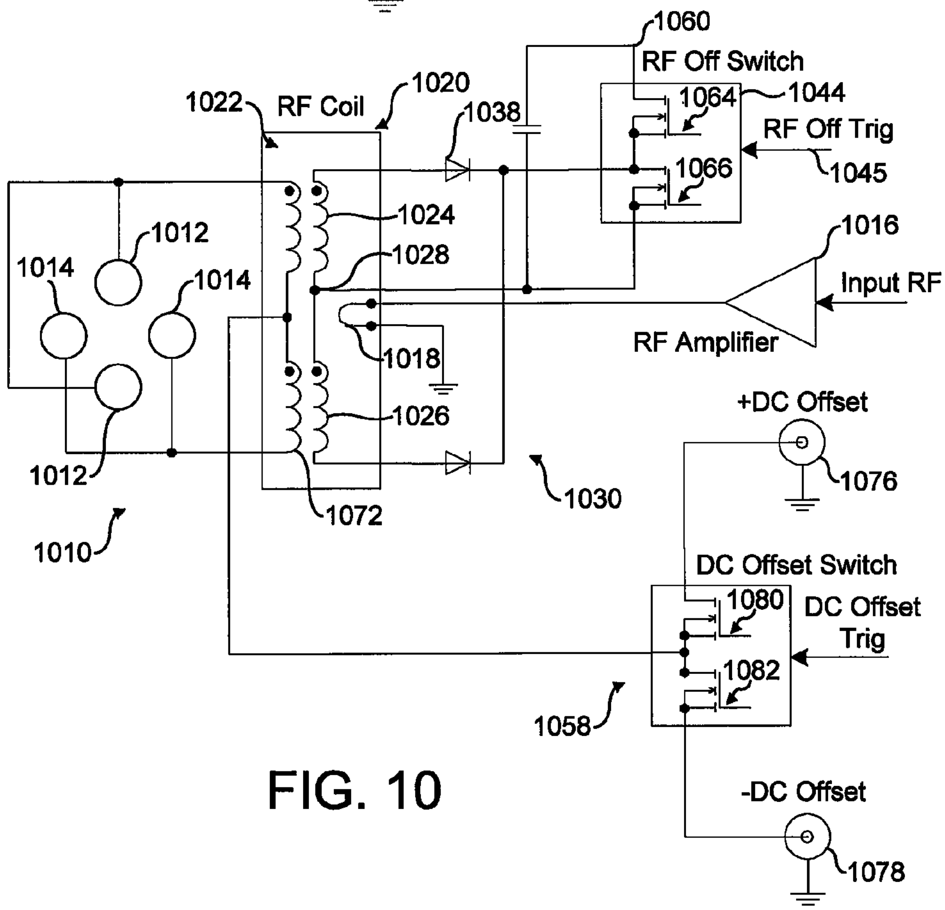
FIG. 10 corresponds to FIG. 4 but shows a fifth embodiment of the present invention.

FIG. 10 shows a power supply 1010 according to a fifth embodiment of the present invention. As for FIGS. 4, 8 and 9, many features are shared and so will not be described again. The same numbering convention is also adopted where the leading "4" has now been replaced by a leading "10".

The transformer 1020 of FIG. 10 comprises a multi-filar secondary 1022 having a first pair of symmetrical, connected windings 1024 and 1026, and a second pair of symmetrical, connected windings 1070 and 1072, wherein the first and second pair are not connected to each other. Both the first and second pair of secondary windings are arranged adjacent one another in juxtaposition such that the RF signal passing through the primary 1018 induces a RF signal in both pairs of secondary windings. The first pair of secondary windings 1024 and 1026 are connected to the full-wave rectifier 1030 in exactly the same fashion as shown in FIG. 9. That is to say, the full-wave rectifier 1030 includes a buffer capacitance 1062 and is connected to a switch 1044 comprising two semiconductor switches 1064 and 1066. However, this arrangement need not be employed in this multi-filar transformer design and instead the single semiconductor switch 444 of FIG. 4 may be employed.

The second pair of secondary windings 1070 and 1072 are connected to the electrodes 1012 and 1014 in a similar fashion to FIG. 4 and FIG. 9, i.e. the ends of the secondary windings 1070 and 1072 remote from a central tap 1074 of the secondary windings 1070 and 1072 are connected to electrodes 1012 and 1014 respectively.

The DC offset 1058 is connected to the central tap 1074 of the second pair of secondary windings 1070 and 1072. Moreover, the DC offset 1058 incorporates a more complicated design in this embodiment, although it is possible to use the simpler DC offset supply akin to that of FIG. 4 or FIG. 9. The DC offset supply 1058 comprises two separate offsets 1076, 1078 that supply a positive and a negative DC offset respectively. Either of these offsets 1076 or 1078 can be selected using a pair of transistor switches 1080 and 1082, thereby allowing easy choice of connection of either a positive or negative DC offset to the field created in the ion trap.

Figure 11A:
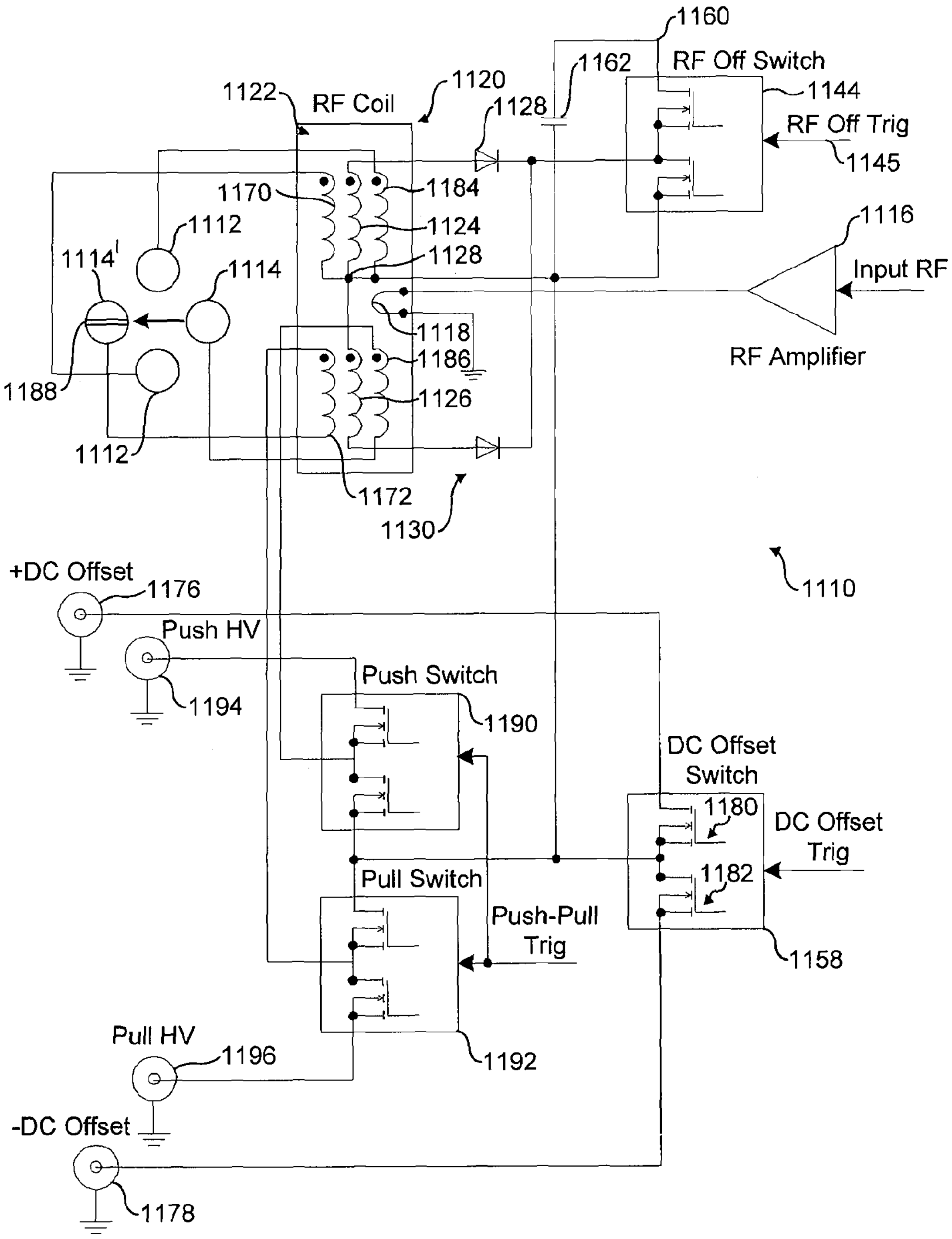
FIG. 11*a* corresponds to FIG. 4 but shows a sixth embodiment of the present invention.

FIG. 11*a* shows a power supply according to a sixth embodiment of the present invention. This embodiment shows in more detail an arrangement for providing orthogonal extraction of ions stored in the ion trap in the x-axis direction, also shown in FIG. 11*a*. To facilitate extraction, a slot is provided in electrode 1114' as indicated at 1188. A similar extraction arrangement of a slot 1188 within an electrode 1114' can be used in any of the other embodiments. Similar to FIG. 9, the embodiment of FIG. 11*a* uses a multi-filar secondary 1122, this time comprising three pairs of symmetrical secondary windings. A first pair of symmetrical windings 1124 and 1126 are connected to the full-wave rectifier 1130. As before, either the basic switch circuit of FIG. 4 may be used or, as is shown in FIG. 11*a*, a more complicated switch 1144 including buffer capacitance 1162 may be employed instead.

In the embodiment of FIG. 11*a*, each of the four electrodes are treated separately. Accordingly, they are now labelled as 1112 and 1112', and 1114 and 1114'. A first secondary winding 1184 of a second pair of secondary windings supplies electrode 1112 whereas electrode 1112' is supplied by a first winding 1170 of a third pair of secondary windings. Electrode 1114 is supplied by a second winding 1186 of the second pair of secondary windings whereas electrode 1114' is supplied by a second winding 1172 of the third pair of secondary windings. As can be seen from FIG. 11*a*, all of the first windings of the first, second and third pair of secondary windings are connected together at the central tap 1128 of the first pair of windings. However, only the second winding 1126 of the first pair is also connected to the central tap 1128. The ends of the first of the windings 1172 and 1186 of the second and third pairs of secondary windings close to the central tap 1128 are instead connected to a DC offset supply.

As with FIG. 10, positive and negative offsets can be set from 1176, 1178 that are selectable through a DC offset switch 1158 comprising two transistors 1180 and 1182. However, rather than supply these DC offset voltages direct to secondary windings 1122, they are routed through further high voltage supply switches 1190 and 1192. These switches 1190 and 1192 that preferably have low internal resistance may be set such that the DC offsets are delivered direct to the secondary windings 1122. However, in an alternative configuration, the switches may be set so that independent HV offsets can be applied to the two secondary windings 1172 and 1186. A push HV supply 1194 supplies a large positive voltage through push switch 1190 that can be set on secondary winding 1186 thereby applying a large positive potential to electrode 1114. This large positive potential repels ions stored in the ion trap towards the aperture 1188 provided in opposite electrode 1114'. A corresponding pull HV supply 1196 supplies a large negative potential through pull switch 1192 and onto secondary winding 1172, thereby applying a large negative potential on electrode 1114' that will attract ions towards its aperture 1188. Accordingly, this arrangement allows either a small DC offset to be applied to the electrodes 1112, 1112', 1114, 1114' that may be used, for example, to provide a potential well for trapping ions within the ion trap. This potential may even, for example, be supplied at the same time as the RF potential being supplied to the electrodes 1112, 1112', 1114, 1114'. When the RF potential is switched off using switch 1144, ions may be ejected orthogonally from the ion trap by applying the push 1194 and pull 1196 HV supplies to the electrodes 1114 and 1114' respectively.

Of course, the circuit of FIG. 11*a* may be adapted, for example, by using only two secondary windings 1122 in the upper half of the transformer 1120 so that both electrodes 1112 and 1112' are supplied from a single winding 1170 or 1184.

Also, this idea may be extended such that ions may be ejected orthogonally from the ion trap, but in any arbitrary radial direction. This is possible by virtue of the separate control of each electrode 1112, 1112', 1114, 1114'. Further push/pull DC offsets may be supplied to electrodes 1112, 1112', such that DC potentials may be set independently on each electrode 1112, 1112', 1114, 1114' to control the direction of ejection. With suitable choices of DC offsets, ions may be ejected through the gaps between electrodes 1112, 1112', 1114, 1114', through aperture 1188 provided in electrode 1114' or through corresponding apertures provided in the other electrodes 1112, 1112', 1114. A possible application of such an arrangement would be for multiple ejections to multiple analysers or to other processing. For example, a first ejection may send some of the trapped ions along a first path to a mass analyser while a second ejection may send some of the trapped ions along a second path to a second analyser or a reaction cell.

Figure 11B:
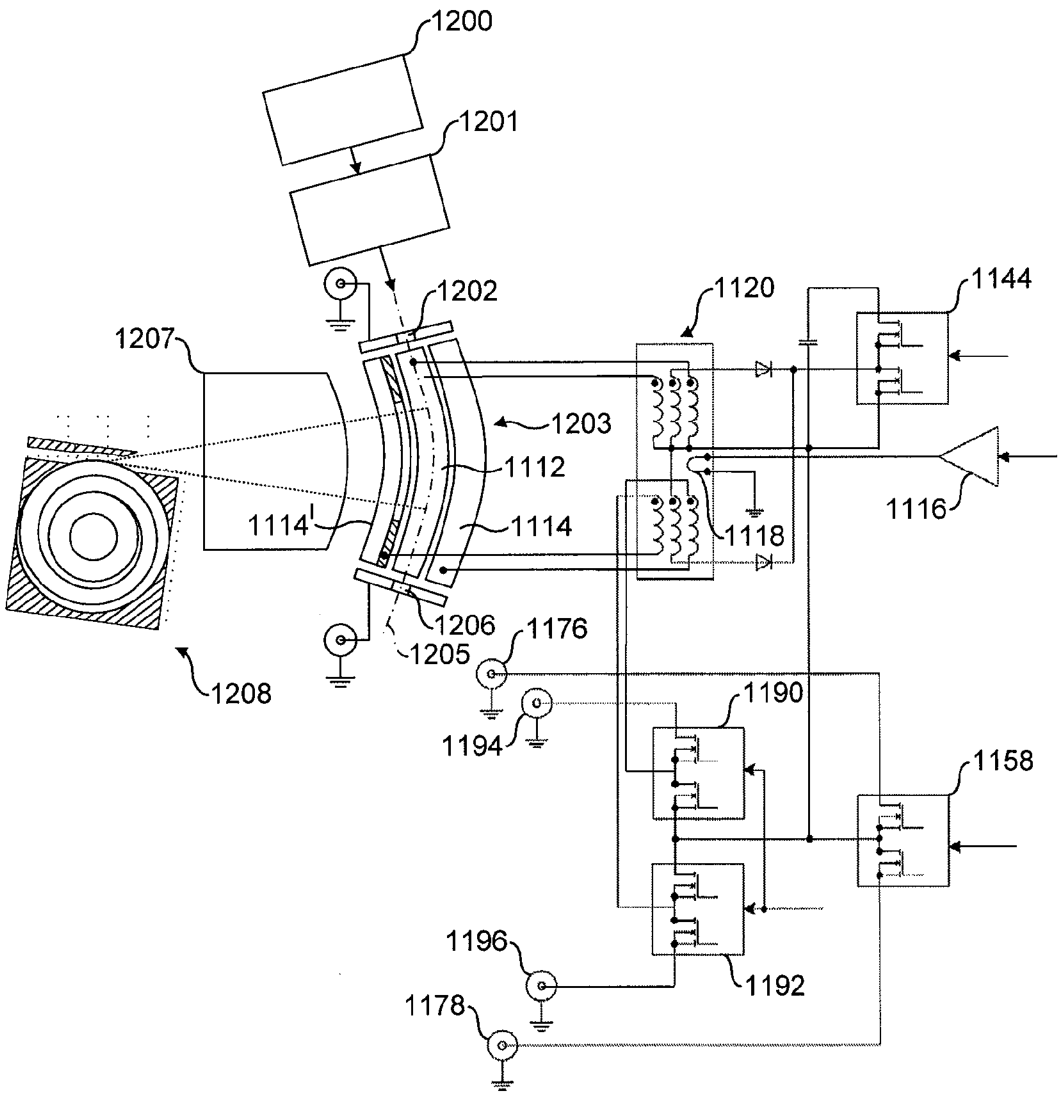
FIG. 11*b* shows the power supply of FIG. 11*a* within the context of an Orbitrap mass analyser.

FIG. 11*b* shows the embodiment of FIG. 11*a* applied to provide compression of ion bunches both in space and in time. Ions generated in ion source 1200 are introduced from a linear trap 1201 according to FIG. 2 of U.S. Pat. No. 5,420,425 through transmission optics (e.g. RF multipole or electrostatic lenses or a collision cell) into curved trapping device 1203 with electrodes 1112, 1114 of essentially hyperbolic shape following the geometry of FIG. 3 of U.S. Pat. No. 5,420,425. Ions lose energy in collisions with bath gas within this trap 1203 and get trapped along its axis 1205. Voltages on the entrance 1202 and end 1206 apertures of the curved trap 1203 are elevated to provide a potential well along the axis 1205. These voltages may be later ramped up to squeeze ions into a shorter thread along this axis 1205. While RF is switched off and extracting DC voltages are applied to the electrodes 1112, 1114, these voltages on the apertures 1202, 1206 stay unchanged. Because of pulsing the DC offset of all hyperbolic electrodes to high voltages, resulting potential distribution during the orthogonal extraction favours divergence of the ion beam towards apertures 1202, 1206. Nevertheless, extraction occurs so fast that this divergence is kept to minimum. Due to initial curvature of the trap 1203 and subsequent ion optics 1207, the ion beam converges on the entrance into the mass analyser 1208, preferably of the Orbitrap type, similar to the manner described in FIG. 6 of WO02/078046.

To improve temporal focusing of ions of the same mass-to-charge ratio, a delay could be introduced between switching RF off and pulsing extracting DC voltages. This will allow ions with higher velocities to move away from the axis 1205 and provide correlation between ion coordinate and velocity. As shown in W. C. Wiley, L. H. McLaren, Rev. Sci. Instrum. 26 (1955) 1150, choosing an appropriate delay allows a reduction in the time width of the ion beam at a focal plane at the entrance to the analyser 1208. For an Orbitrap mass analyser, this improves coherence of ions, while for TOFMS it improves resolving power directly.

Fast pulsing of DC voltages on the RF secondary 1120 allows all ions to be raised to the desired energy ("energy lift"). If the rise-time is much smaller than the duration of ion extraction from the trap 1203, then all ions with the same m/z ratio will be accelerated approximately by the same voltage. For injection into the Orbitrap mass analyser 1208, however, it is preferable that ions with lower m/z values enter the Orbitrap analyser 1208 at lower energies (as the trapping voltage is still low) while ions with higher m/z values enter the analyser 1208 with higher energies. This could be achieved by reducing the rate of increase of DC voltages, for example, by installing a resistor between the switch 1158 and the corresponding RF secondary 1120. Then an RC-chain is formed by this resistor and the capacitance of the secondary 1120 (although additional capacitances could be used if desired) that will determine the rise-time constant of the DC voltage. It could be tuned to provide the optimum match to the ramp of the central electrode of the Orbitrap analyser 1208. Also, these time-constants could differ in order to provide mass-dependant focusing conditions to compensate for mass-dependant effects of RF fields.

Figure 11C:
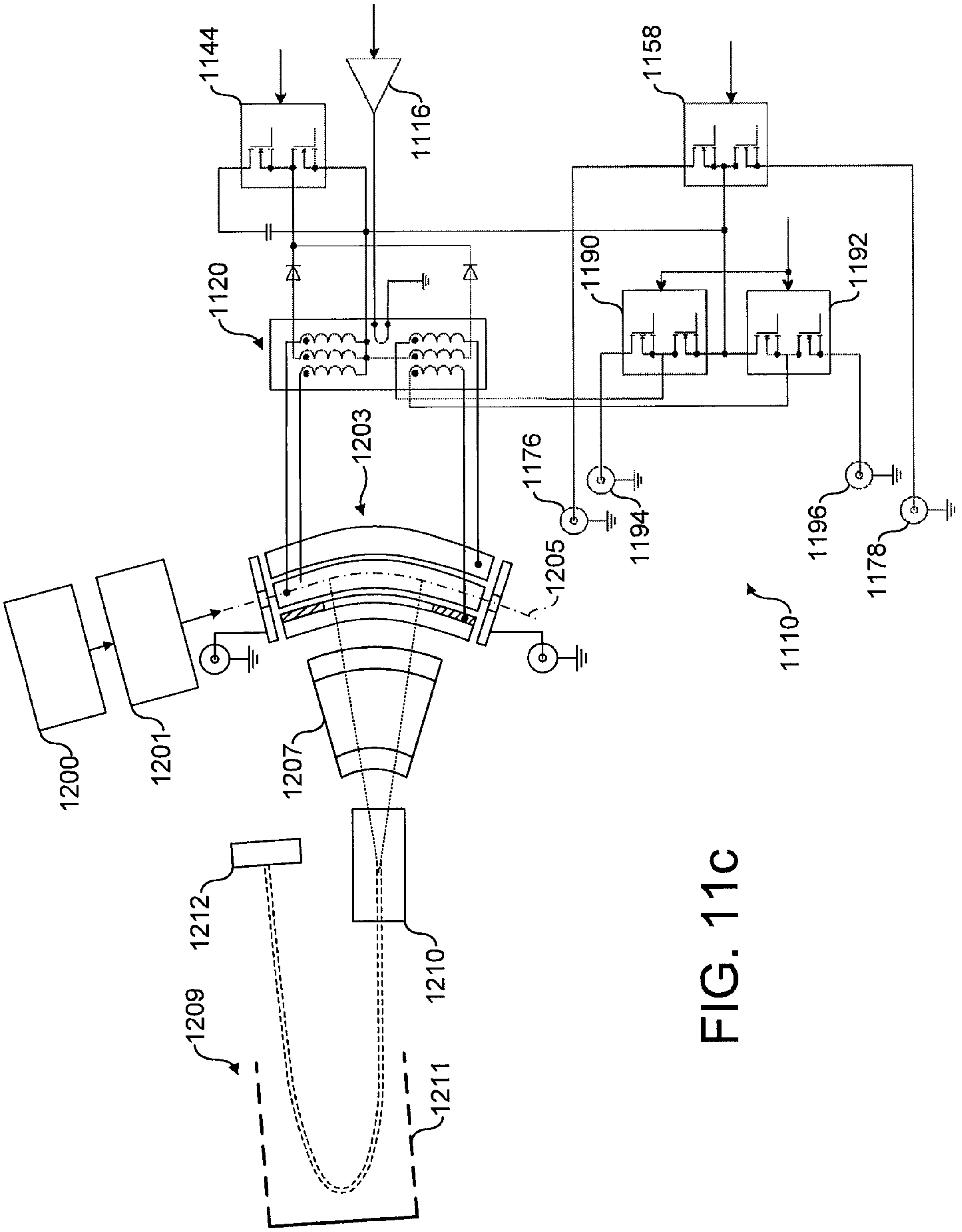
FIG. 11*c* shows the power supply of FIG. 11*a* within the context of time of flight analyser.

FIG. 11*c* shows a further embodiment of the present invention. The mass spectrometer of FIG. 11*c* largely corresponds to the spectrometer of FIG. 11*b*, except that the Orbitrap mass analyser 1208 has been replaced by a time of flight (TOF) analyser 1209. Accordingly, ions exiting the trap 1203 are focussed by ion optics 1207, formed into a beam by ion optics 1210, deflected by ion mirror 1211 and measured by detecting element 1212. The TOF detector 1209 may be of any design.

As will be readily appreciated by those skilled in the art, the above embodiments are but merely examples and may be readily varied without departing from the scope of the present invention.

For example, some of the features of the various embodiments shown in FIGS. 4, 8, 9, 10 and 11 may be used interchangeably. For example, the buffer capacitance 62 is optional and may be included or excluded from any of the embodiments shown in those Figures. Furthermore, any of the various DC offset arrangements may be used. In addition, choices between single filar windings for the secondary 22 may be changed with the choice of the bi-filar arrangement of FIG. 10 and the tri-filar arrangement of FIG. 11 or any other multi-filar configuration for that matter, as conditions dictate.

While switches 444; 844; 944; 1044, 1058; 1144, 1158 have been described as being unipolar in the embodiments above, bipolar switches may be used. This allows operation of the power supply 410; 810; 910; 1010; 1110 with both positive and negative ions.

The accompanying figures show single diodes 438, 440; 838; 938, 940; 1038, 1040; 1138, 1140. However, these rectifying diodes may be realised as a group of several diodes.

Whereas a single primary is shown in the Figures, this may be changed to produce a dual RF output by using two primary windings that are wound in opposite senses.

Further modifications could include pulsing ions along the axis of a straight or curved linear trap; a combination of the above circuits with additional elements to provide AC excitation of ions; and so on. The mass analyser may be of any pulsed type, including FT ICR, Orbitrap, TOFMS, another trap, but also ions could be transferred into a collision cell, or any other transmission or reflecting ion optics, with or without RF fields. In general, any device with ion manipulation by RF fields could benefit from this invention. Pulsing of RF off and on could be also used for excitation of ions, for example when collision-induced dissociation is desired.

Figure 1:
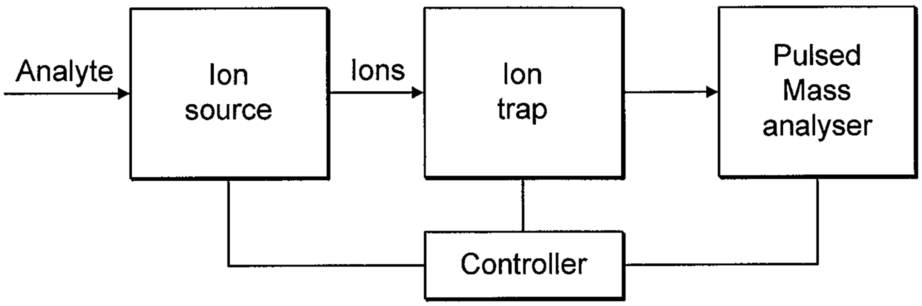
FIG. 1 is a block diagram representation of a mass spectrometer.
Figure 2A:
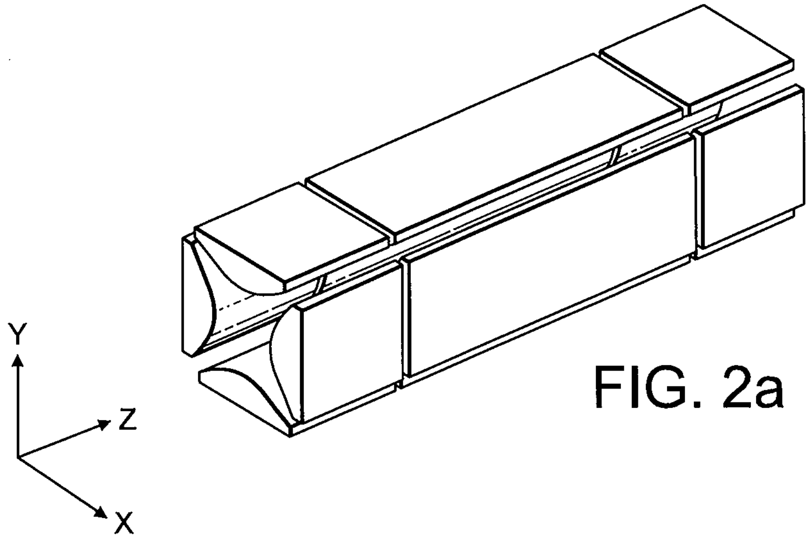
FIG. 2*a* is a representation of a linear quadrupole ion trap and FIGS. 2*b*-2*c* illustrate the DC, AC and RF voltages used for operation of the ion trap.
Figure 2B:
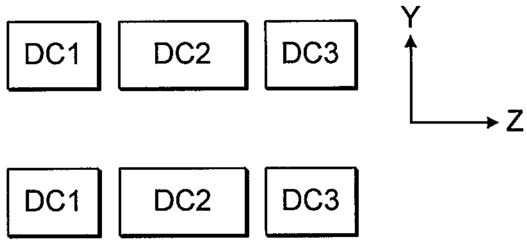
Figure 2C:
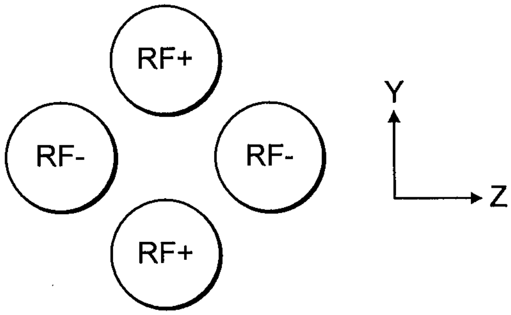
Figure 3:
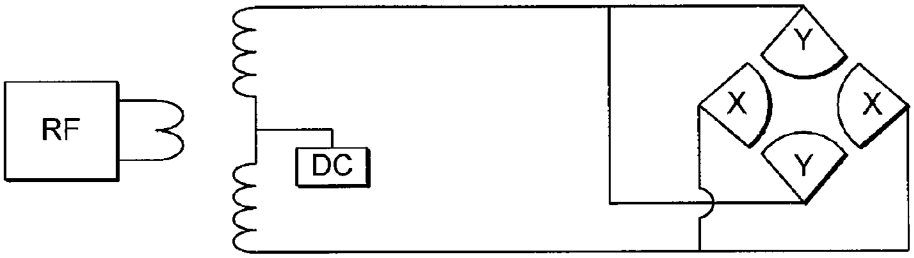
FIG. 3 shows schematically a circuit for applying RF and AC voltages to the electrodes of an ion trap.

The above circuits may be varied, as will be appreciated by those skilled in the art, in order to accommodate multi-section electrodes such as those shown in FIG. 2. This may comprise providing separate power supplies for each of the front, centre and back sections of the electrodes or may merely comprise an arrangement that allows different DC offsets to be applied to the front and back sections as opposed to the centre section.

The present invention finds application beyond just the quadrupole ion traps described above. It will be readily apparent to the person skilled in the art that the present invention may be practised on ion traps with an arbitrary number of electrodes, such as octapole traps that are well known in the art.

As will be appreciated, provision of an AC signal to the electrodes has not been discussed in the above embodiments but incorporation of such provision will be straightforward to those skilled in the art.

While the above describes using the shunt primarily to collapse rapidly the RF field prior to ejection of ions from the trap, there are also benefits to be gained from the rapid creation of the field in the ion trap. An example is the trapping of ions in the ion trap. The shunt may be operated to short the transformer and switch the RF off while ions arrive in the trap. Ions may be injected towards the central axis of the trap through an aperture in an electrode (such as aperture 1188) or between electrodes. DC voltages may be placed on the electrodes to favour transmission of the ions and focusing towards the axis. Preferably, the ions are decelerated significantly as they travel towards the axis. Once the ions of interest have reached the axis, the DC voltages are pulsed to favour capture of ions (e.g. all DC voltages are equalised) and the shunt is used to turn the RF field back on rapidly. Thus, the ions of interest are captured by the RF field.

A further application for fast switching of the fields is during electron injection into the ion trap. Ions may be stored in the ion trap and slow electrons introduced to cause electron capture dissociation (ECD). RF fields are undesirable because they make the injected electrons unstable and the electrons are lost from the trap as a result. Thus, the shunt may be used to kill the RF field, a short burst of electrons may then be introduced to react with the ions in the trap, then the shunt may be used to re-establish the RF field to trap the fragments. Ideally, the RF field is collapsed only for a few cycles: this provides enough time for ECD, but not long enough for ions that their fragments to drift from the trap.

What is claimed is:

1. An ion storage device, comprising:

at least four elongated electrodes defining an ion storage volume, the electrodes defining first and second radial directions along with ions may be ejected from the ion storage volume to a location external to the ion storage device, the first and second radial directions being different;

a power supply for providing RF potentials to the at least four electrodes to establish an RF field that radially confines ions within the ion storage volume;

the power supply further providing independently controllable DC offsets to each one of the at least four electrodes, the power supply being configured to, in response to selection of one of the first or second radial directions, adjust DC offsets applied to the at least four electrodes to cause ions to be orthogonally ejected from the ion volume in the selected radial direction.

2. The ion storage device of claim 1, wherein the power supply includes:

an RF signal supply;

a coil having a primary winding coupled to the RF signal supply, and a plurality of secondary windings coupled to the at least four electrodes, the primary and plurality of secondary windings being arranged to induce RF signals in each of the plurality of secondary windings; and a shunt including a switch, operative to switch between a first state in which the shunt shorts the coil to switch off the RF field in the ion trap, and a second state in which the RF field is established within the ion trap.

3. The ion storage device of claim 1, wherein each of the independently controllable DC offsets is delivered to a corresponding one of the secondary windings.

4. The ion storage device of claim 3, wherein each of the independently controlllable DC offsets is routed through a high voltage supply switch.

5. The ion storage device of claim 2 wherein the shunt switch is a semiconductor switch.

6. The ion storage device of claim 1, wherein the at least four electrodes each have a hyperbolic surface facing the ion storage volume.

7. The ion storage device of claim 1, wherein at least a first and a second electrode of the at least four electrodes are adapted with an aperture through which ions may travel.

8. The ion storage device of claim 7, wherein the power supply is selectively operable to apply a first set of DC offsets to the at least four electrodes to eject ions through the aperture in the first electrode or a second set of DC offsets to the at least four electrodes to eject ions through the aperture in the second electrode.

9. The ion storage device of claim 1, wherein a first adjacent pair of the at least four electrodes define a first gap therebetween and a second adjacent pair of the at least four electrodes define a second gap therebetween, and wherein the power supply is selectively operable to apply a first set of DC offsets to the at least four electrodes to eject ions through the first gap or a second set of DC offsets to the at least four electrodes to eject ions through the second gap.

10. A mass spectrometer, comprising:

an ion storage device including at least four elongated electrodes defining an ion storage volume;

a first mass analyzer positioned to receive ions orthogonally ejected from the ion storage device in a first radial direction;

a processing device including at least one of a collision/reaction cell and a second mass analyzer positioned to receive ions orthogonally ejected from the ion storage device in a second radial direction, the second radial direction being different from the first radial direction;

a power supply for providing RF potentials to the at least four electrodes to establish an RF field that radially confines ions within the ion storage volume;

the power supply further providing independently controllable DC offsets to each one of the at least four electrodes, the power supply being configured to, in response to selection of one of the first or second radial directions, adjust DC offsets applied to the at least four electrodes to cause ions to be orthogonally ejected from the ion volume in the selected radial direction.

11. The mass spectrometer of claim 10, wherein at least one of the first and second radial directions extends through an aperture formed in one of the electrodes.

12. The mass spectrometer of claim 10, wherein at least one of the first and second radial directions extends through a gap defined between adjacent electrodes.

* * * * *